E. BRAUER.
FRICTION WHEEL.

No. 186,304. Patented Jan. 16, 1877.

2 Sheets—Sheet 1.

Witnesses:
Inventor:
Ernst Brauer

E. BRAUER.
FRICTION WHEEL.

No. 186,304.

Patented Jan. 16, 1877.

2 Sheets—Sheet 2.

Witnesses:

Inventor:
Ernst Brauer
Per Atty

UNITED STATES PATENT OFFICE.

ERNST BRAUER, OF BERLIN, PRUSSIA.

IMPROVEMENT IN FRICTION-WHEELS.

Specification forming part of Letters Patent No. 186,304, dated January 16, 1877; application filed December 28, 1876.

*To all whom it may concern:*

Be it known that I, ERNST BRAUER, of Berlin, Prussia, have invented an Improvement in Friction-Wheels designed to replace the use of cog-wheels, of which the following is a specification:

The present invention has reference to friction wheels or gearing having annular teeth and grooves extending around their peripheries for the purpose of communicating motion, such wheels, when geared together, fitting, by their annular teeth and grooves, the one into the other. These wheels, as heretofore constructed, have been but little used, and are objectionable, because by the formation and arrangement of their teeth a dragging or cutting friction results, which not only consumes a large amount of power without useful effect, but causes great and unequal wear upon the teeth, diminishes the useful frictional surface in contact, and rapidly destroys the wheel.

The teeth of the ordinary grooved friction-wheels are fixed or stationary, and no means are provided for increasing or diminishing the traction or adhesion between the wheels, which is very desirable in many instances.

I avoid the objections incidental to the wheels previously constructed by the employment of annular rings or teeth, which are set on the periphery of a wheel in such a manner as to be adjustable in a lateral direction, but incapable of turning on the wheel. The rings or teeth are fitted on rods having a washer interposed between each pair of rings, so as to prevent noise or rattling. For adjusting and tightening the rings I employ a collar or sleeve, which bears upon the rings, and serves to maintain the same in a vertical position in respect to each other. The teeth of one wheel are provided with plane surfaces, and those of the other wheel are of a V or wedge shape, so as to obviate a too great frictional contact between the wheels.

The particular construction and operation of my invention will be hereinafter more fully described, reference being had to the accompanying drawings, in which—

Figure 1:
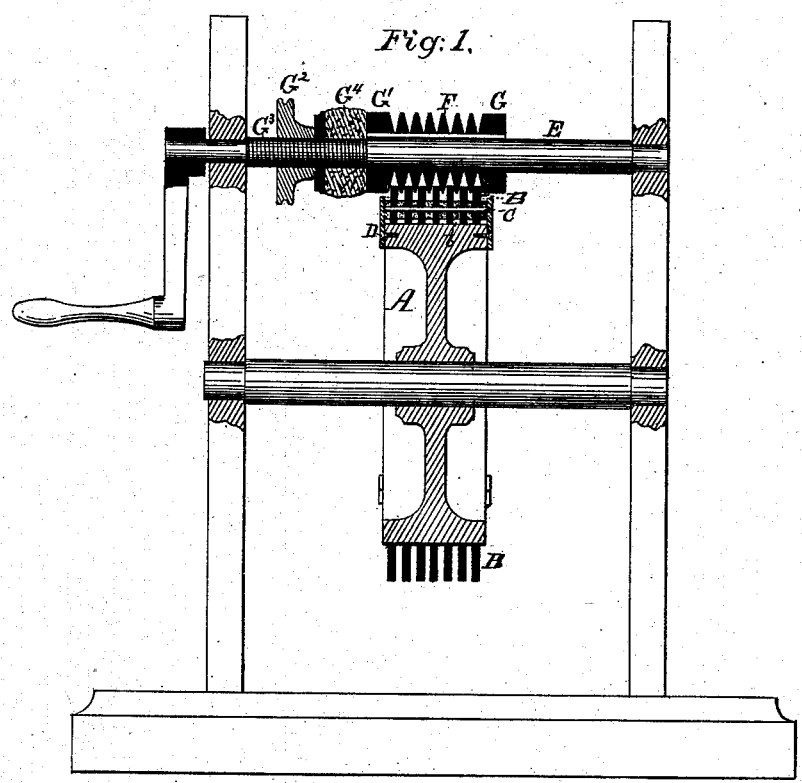
Figure 2:
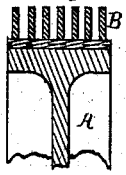
Figure 3:
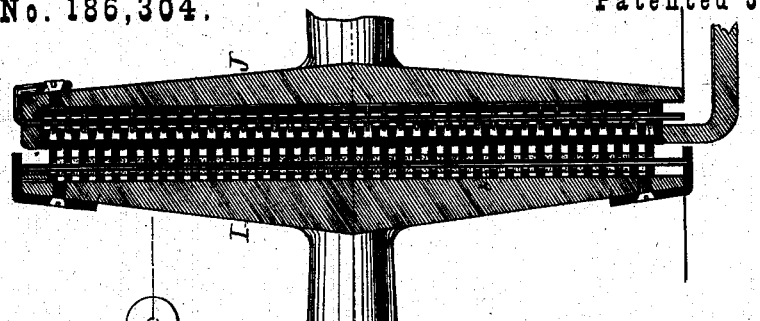
Figure 4:
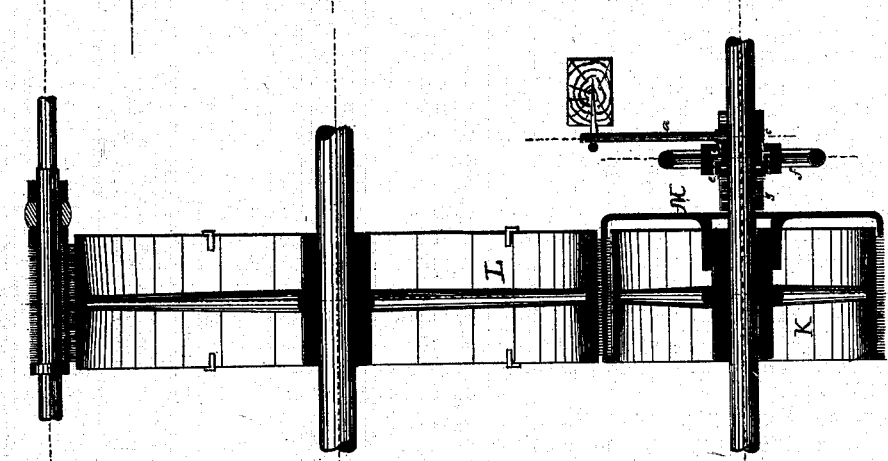
Figure 5:
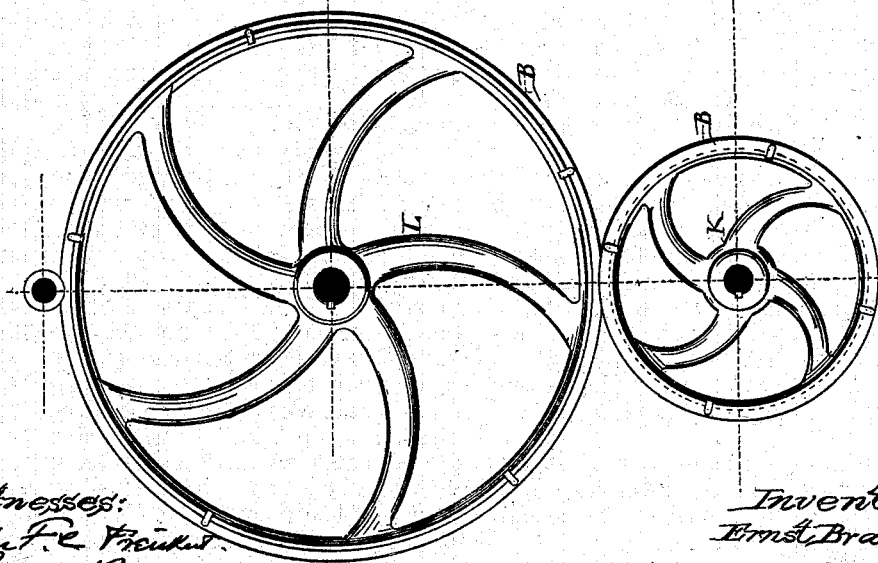

Figure 1 is a vertical sectional view of one form of frictional gearing. Fig. 2 is a detail view, showing the manner of preventing the turning of the annular rings on the wheel. Fig. 3 is a sectional view of two wheels with the friction-rings placed on the side face of the wheel. Fig. 4 is a sectional view, illustrating three wheels geared together; and Fig. 5 is a front view of the same.

The letter A in Fig. 1 denotes a driven wheel, which carries a series of circumferential rings or teeth, B, that are adjustably and detachably fitted on the wheel, and are prevented from turning thereon through the medium of a spline-and-feather connection, as is shown in Fig. 2. The rings B are held together and retained in their proper relative position by means of rods C, which are secured to plates or ears D, attached to the wheel A. A washer, $b$, of leather or other suitable material, is placed between each pair of rings, for spacing the same and preventing noise or rattling. The driving-shaft E carries a series of disks, F, which are of a V or wedge shape in cross-section, and fitted between a stationary collar, G, and an adjustable collar, $G^1$. The disks F form the driving-wheel, and fit into the spaces or grooves of the driven wheel, which they serve to turn by frictional contact with the plane-side surfaces of the same.

By making the rings of one wheel of a V shape in cross-section the frictional contact between the two wheels is concentrated at one point, so as to avoid unnecessary and injurious friction.

The disks F are prevented from turning on the shaft by an ordinary spline-and-feather connection, and they are made adjustable therein, so as to increase or diminish the frictional contact between the two wheels, and throw the wheels entirely out of gear. This adjustment of the disks is effected by a movable milled nut, $G^2$, fitted on the screw-threaded portion $G^3$ of the driving-shaft, and bearing on a rubber spring, $G^4$, interposed between the adjustable collar $G^1$ and said nut.

As shown in Fig. 3, plane-faced and wedge-shaped rings are fitted on the contiguous or opposing faces of two equal-sized wheels, I J, instead of being applied to the peripheries of the wheels. The rings are adjustably and detachably secured in place by the rods and washers, and one of the wheels has an adjusting device combined therewith.

Figs. 4 and 5 exhibit three differently-sized wheels in gear with each other, each wheel having teeth or rings on its periphery, which are retained in position by the means already described, or other suitable devices. The lower wheel K is half the diameter of the center wheel L, and has the adjusting devices combined therewith. In this instance, a pressure disk or plate, M, fitted on the hub of the wheel K, bears upon the friction-rings, and serves to maintain the same in an erect position, notwithstanding the pressure that may be caused to bear upon said rings during the operation of the wheels. The pressure-disk M is adjusted by means of a hand-nut, $f$, which is provided with an internal screw-thread for receiving the external thread of a nut, $e$, encircling the shaft of the wheel K, and bearing on a rubber spring, $g$, interposed between the pressure-plate and said nut $e$. The hand-nut is movable on a collar, $c$, which is fitted loosely on the wheel-shaft, and prevented from turning with the same by means of an arm or rod, $d$, bearing against a stationary object or stop-piece.

By adjusting the pressure-plate the friction-rings will be caused to bear upon each other with more or less pressure, and the wheels can be thrown entirely out of gear, in the manner already described.

The advantages and superiority of my invention over the ordinary friction gear-wheels are manifest, and it is only necessary to state the salient points of advantage, which are: the independent and detachable connection of the friction-disks with the wheels, so as to enable the same to be adjusted; the presence of devices for adjusting the disks, so as to vary the pressure and throw the same entirely out of gear.

Having thus described my invention, what I claim as my invention, and desire to secure by Letters Patent, is—

1. A friction-wheel for communicating motion, having detachable and adjustable rings or teeth, substantially as herein set forth.

2. A friction-wheel having a series of circumferential rings or teeth, and tie or connecting rods, as and for the purpose set forth.

3. The combination of an adjustable pressure collar or plate with the adjustable rings and wheel and shaft, substantially as and for the purpose set forth.

In testimony whereof I have signed my name to this specification in the presence of two subscribing witnesses.

ERNST BRAUER.

Witnesses:
GERARD WENRESLAUS NAWROCKI,
FRITZ MENNECKE.